(12) United States Patent
Nakamura

(10) Patent No.: US 12,315,038 B2
(45) Date of Patent: May 27, 2025

(54) IMAGING APPARATUS, INFORMATION PROCESSING APPARATUS, CONTROL METHOD, AND STORAGE MEDIUM

(71) Applicant: CANON KABUSHIKI KAISHA, Tokyo (JP)

(72) Inventor: Kenta Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 18/172,977

(22) Filed: Feb. 22, 2023

(65) Prior Publication Data
US 2023/0274470 A1 Aug. 31, 2023

(30) Foreign Application Priority Data
Feb. 25, 2022 (JP) .................... 2022-028247

(51) Int. Cl.
*G06T 11/00* (2006.01)
*G06T 7/70* (2017.01)
(Continued)

(52) U.S. Cl.
CPC ............ *G06T 11/00* (2013.01); *G06T 7/70* (2017.01); *H04N 23/661* (2023.01); *H04N 23/695* (2023.01); *G06T 2207/20221* (2013.01)

(58) Field of Classification Search
None
See application file for complete search history.

(56) References Cited

U.S. PATENT DOCUMENTS

| 5,930,740 A | 7/1999 | Mathisen |
| 6,864,886 B1 | 3/2005 | Cavallaro |

(Continued)

FOREIGN PATENT DOCUMENTS

| JP | 2011035638 A | 2/2011 |
| WO | 03/041411 A1 | 5/2003 |
| WO | 2020/174226 A1 | 9/2020 |

OTHER PUBLICATIONS

Ji, Qiang, and Songtao Dai. "Self-calibration of a rotating camera with a translational offset." IEEE transactions on robotics and automation 20.1 (2004): 1-14.*

(Continued)

*Primary Examiner* — Ryan M Gray
(74) *Attorney, Agent, or Firm* — Canon U.S.A., Inc. IP Division

(57) ABSTRACT

An imaging apparatus configured to communicate with an information processing apparatus that generates an image, based on information about a viewpoint position set in a virtual space, the imaging apparatus includes an imaging unit configured to capture an image of a subject formed by an imaging optical system, a drive unit configured to rotate an imaging direction of the imaging unit in a pan direction or a tilt direction, an acquisition unit configured to acquire a position that does not change by rotation of the drive unit as a reference position, and acquire a position of an entrance pupil of the imaging optical system with respect to the reference position, and an output unit configured to output information including the position of the entrance pupil to the information processing apparatus, wherein the viewpoint position is set based on the position of the entrance pupil.

14 Claims, 10 Drawing Sheets

(51) Int. Cl.
  *H04N 23/661* (2023.01)
  *H04N 23/695* (2023.01)

(56) References Cited

U.S. PATENT DOCUMENTS

| | | | |
|---|---|---|---|
| 10,196,005 B2 * | 2/2019 | Eytan | H04N 17/002 |
| 2005/0168485 A1 | 8/2005 | Nattress | |
| 2010/0045700 A1 * | 2/2010 | Lefevre | H04N 23/695 |
| | | | 345/633 |
| 2015/0350552 A1 * | 12/2015 | Pryszo | H04N 23/695 |
| | | | 348/143 |
| 2016/0366342 A1 * | 12/2016 | Vonolfen | G06T 7/20 |
| 2017/0142338 A1 * | 5/2017 | Tanaka | H04N 23/69 |

OTHER PUBLICATIONS

Juhyun Oh, et al., Practical Pan-Tilt-Zoom-Focus Camera Calibration for Augmented Reality, Computer Vision Systems. ICVS 2009. Lecture Notes in Computer Science, vol. 5815, 2009.

* cited by examiner

FIG.6

| | |
|---|---|
| PAN ANGLE | < PAN ANGLE > |
| TILT ANGLE | < TILT ANGLE > |
| ROLL ANGLE | < ROLL ANGLE > |
| X POSITION | < ENTRANCE PUPIL X POSITION > |
| Y POSITION | < ENTRANCE PUPIL Y POSITION > |
| Z POSITION | < ENTRANCE PUPIL Z POSITION > |
| ZOOM | < ZOOM POSITION > |
| FOCUS | < FOCUS POSITION > |

# IMAGING APPARATUS, INFORMATION PROCESSING APPARATUS, CONTROL METHOD, AND STORAGE MEDIUM

BACKGROUND OF THE INVENTION

Field of the Invention

The present invention relates to an imaging apparatus, an information processing apparatus, a control method, and a storage medium.

Description of the Related Art

In recent years, various video image expressions have been made possible by combining a real video image captured by a camera and computer graphics (CG). As a combining processing method, there is known a system called a virtual studio that links the operation of a real video image camera with a viewpoint in a three-dimensional virtual space, and generates CG corresponding to the operation of the real video image camera. Japanese Patent Application Laid-Open No. 2011-35638 discusses a technique in which camera data of a real video image camera including a unit for detecting camera operation information based on an operation by a user is input into a CG video image generation apparatus, and a CG video image reflecting the camera operation information is repeatedly created to match a real video image.

SUMMARY OF THE INVENTION

According to an aspect of the present invention, an imaging apparatus configured to communicate with an information processing apparatus that generates an image, based on information about a viewpoint position set in a virtual space, the imaging apparatus includes an imaging unit configured to capture an image of a subject formed by an imaging optical system, a drive unit configured to rotate an imaging direction of the imaging unit in a pan direction or a tilt direction, an acquisition unit configured to acquire a position that does not change by rotation of the drive unit as a reference position, and acquire a position of an entrance pupil of the imaging optical system with respect to the reference position, and an output unit configured to output information including the position of the entrance pupil to the information processing apparatus, wherein the viewpoint position is set based on the position of the entrance pupil.

Further features of the present invention will become apparent from the following description of embodiments with reference to the attached drawings.

BRIEF DESCRIPTION OF THE DRAWINGS

FIG. 6 is a diagram illustrating an example of a format of camera data according to the first embodiment.

DESCRIPTION OF THE EMBODIMENTS

Embodiments of the present invention will be described in detail below with reference to the attached drawings. The embodiments to be described below are merely examples for implementing the present invention, and can be appropriately modified or changed depending on configurations and various conditions of apparatuses to which the present invention is applied. Thus, the present invention is no way limited to the following embodiments. In addition, parts of the embodiments to be described below may be appropriately combined and configured.

(System Configuration)

Figure 1:
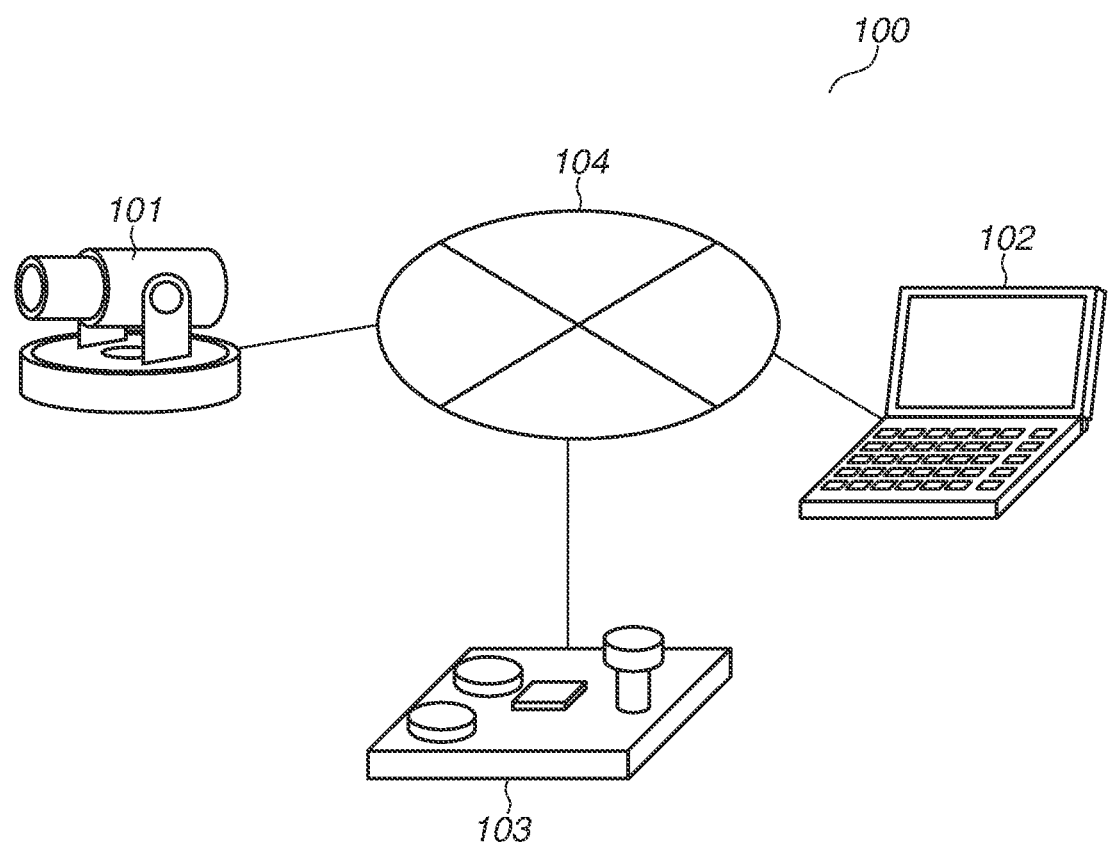
FIG. 1 is a diagram illustrating an example of a system according to a first embodiment.

FIG. 1 is a diagram illustrating an example of a configuration of an imaging system 100 according to a first embodiment. The imaging system 100 includes an imaging apparatus 101, an information processing apparatus 102, a control apparatus 103, and a network 104.

The imaging apparatus 101 captures an image of a subject in a real space and generates image data. The imaging apparatus 101 transmits the generated image data to the information processing apparatus 102 via the network 104, in response to a request from the control apparatus 103. The imaging apparatus 101 may transmit image data and the like to the information processing apparatus 102 or the control apparatus 103, without receiving a request from the control apparatus 103. The imaging apparatus 101 operates by receiving operation information from the control apparatus 103 via the network 104. A viewing angle can be changed by driving the imaging apparatus 101 in a pan direction or a tilt direction or by changing the magnification of an optical zoom. Therefore, the operation information from the control apparatus 103 includes information for controlling the drive in the pan direction or the tilt direction and information for setting a magnification of the optical zoom. The operation information is determined by various methods such as an input by a user and a function of automatically tracking a subject. The imaging apparatus 101 transmits information about the imaging apparatus 101, including the current position and orientation, a zoom magnification, a focus position, and a rotation angle in the pan direction or the tilt direction, to the information processing apparatus 102, as camera setting information. The configuration of the camera setting information is, desirably, a configuration desirable for the information processing apparatus 102 in performing combining processing to be described below, and can be changed as appropriate.

The information processing apparatus 102 sets a viewpoint in a virtual space, based on the camera setting information received via the network 104. Subsequently, based on the viewpoint set in the virtual space, the information processing apparatus 102 generates an image of the virtual space viewed from the set viewpoint, as a virtual space image (computer graphics (CG)). Further, the information processing apparatus 102 can express a video image in which the subject in the real space appears as if to be present in the virtual space, by combining the generated virtual space image and the image data received from the imaging apparatus 101 via the network 104. Examples of the information processing apparatus 102 include a personal computer (PC), a tablet terminal, and a smartphone. It is also possible to operate an object in the virtual space, based on the received camera setting information. For example, the viewpoint in the virtual space may be handled as an object representing the camera and operated, based on the camera setting information.

The control apparatus 103 is an apparatus for operating the imaging apparatus 101. For example, the control apparatus 103 may be a PC, a tablet terminal, a smartphone, or an apparatus such as a dedicated or general-purpose controller device for operating the imaging apparatus 101. The control apparatus 103 receives image data transmitted from the imaging apparatus 101 and displays the received image data, and transmits operation information to the imaging apparatus 101 based on an operation by a user. The operation information is control information for causing the imaging apparatus 101 to execute a specific function, and includes information for controlling the drive in the pan direction or the tilt direction of the imaging apparatus 101 and information for controlling the zoom magnification and the focus position of an imaging optical system.

The network 104 is a network implemented by the Internet, a wired/wireless local area network (LAN), a wide area network (WAN), or a combination of these networks. For example, the network 104 includes a plurality of routers, switches, and cables conforming to a communication standard of the Ethernet (registered trademark). The communication standard, the scale, and the configuration of the network 104 may be of any type if the network 104 can communicate with the imaging apparatus 101, the information processing apparatus 102, and the control apparatus 103.

(Apparatus Configuration)

Figure 2:
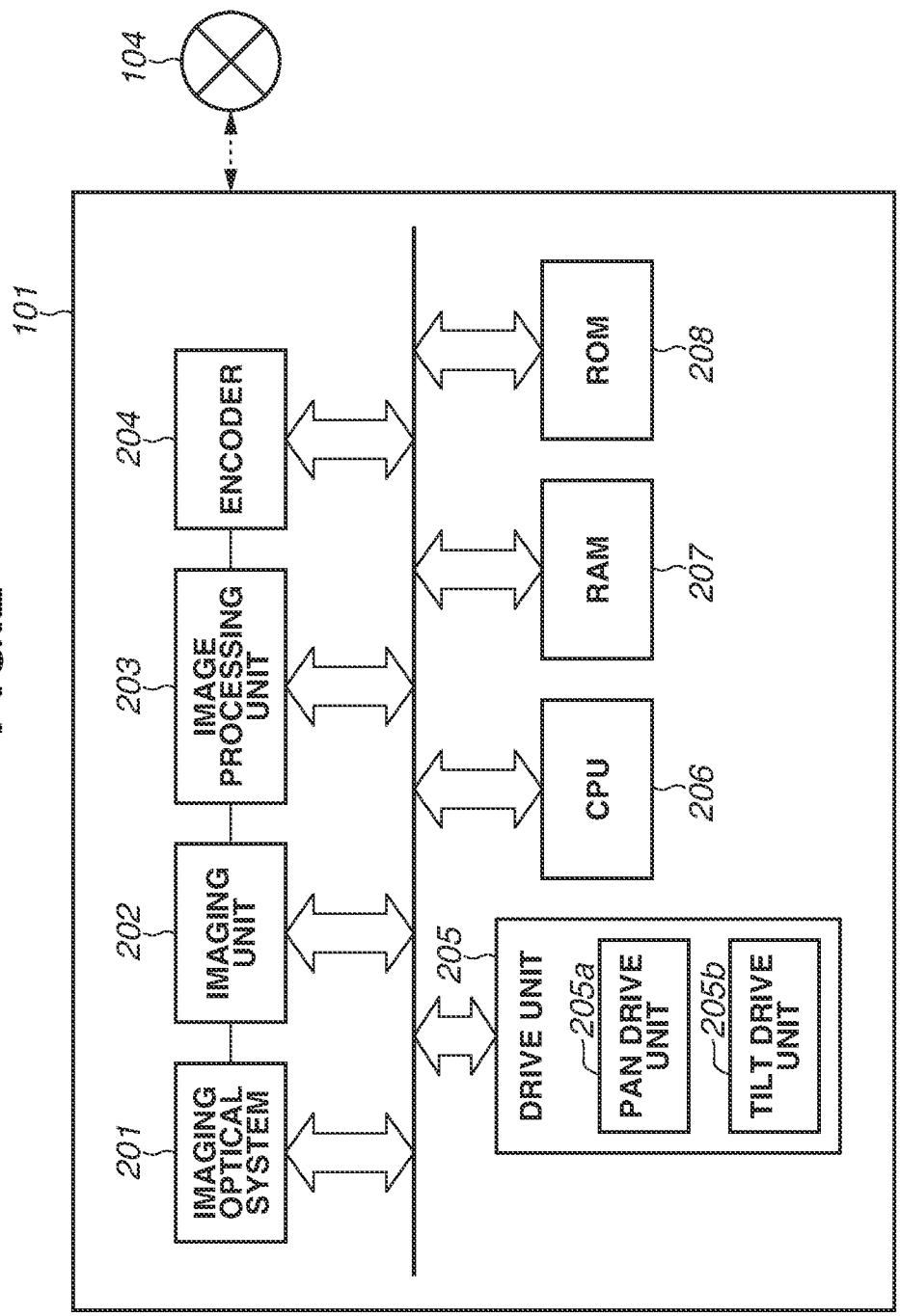
FIG. 2 is a diagram illustrating an example of an apparatus configuration of an imaging apparatus according to the first embodiment.

FIG. 2 is a diagram illustrating an example of an apparatus configuration of the imaging apparatus 101 according to the present embodiment. The imaging apparatus 101 has an imaging optical system 201, an imaging unit 202, an image processing unit 203, an encoder 204, a drive unit 205, a central processing unit (CPU) 206, a random access memory (RAM) 207, and a read only memory (ROM) 208.

The imaging optical system 201 is a lens for focusing light from a subject on an imaging surface of the imaging unit 202, and includes a zoom lens, a focal lens, and a blur correction lens. In the present embodiment, the imaging optical system 201 is configured as an optical system integral with the imaging apparatus 101, but may be detachable as with an interchangeable lens. The imaging optical system 201 drives the lens to change the magnification of the optical zoom based on the operation information received from the control apparatus 103, and to adjust the focus position depending on a distance to the subject. A position to be the starting point of the viewing angle of the imaging optical system 201 is the position of an entrance pupil, and the viewing angle is varied by a change in the optical zoom magnification and an adjustment to the focus position, so that the position of the entrance pupil moves back and forth.

The initial position of the entrance pupil is stored beforehand in a storage unit (not illustrated) in the imaging optical system 201 or a storage unit such as the ROM 208 in the imaging apparatus 101. Examples of the initial position of the entrance pupil include the position of the entrance pupil in an initialized state at the time of a power supply input to the drive unit 205.

The imaging unit 202 is an image sensor that captures an image of the subject. The imaging unit 202 is, for example, a charge coupled device (CCD) or a complementary metal oxide semiconductor (CMOS) sensor. The imaging unit 202 converts the light from the subject focused by the imaging optical system 201 into an electrical signal and outputs the electrical signal, thereby capturing the image of the subject.

The image processing unit 203 converts the electrical signal from the imaging unit 202 into a digital signal by performing analog-to-digital (AD) conversion. The image processing unit 203 performs various types of image processing, including color interpolation processing, demosaicing processing, white balance processing, and gamma processing, for the converted image data (digital signal).

The encoder 204 performs processing of encoding the image data subjected to the image processing into a file format such as Motion Jpeg, H264, or H265, and outputs the encoded image data. The encoded image data is output to the information processing apparatus 102 or the control apparatus 103 via the network 104.

The drive unit 205 has a pan drive unit 205a and a tilt drive unit 205b, and these drive units each perform rotation drive based on the operation information input from the control apparatus 103, so that the direction of the imaging apparatus 101 changes. In the present embodiment, a point at which a drive axis of the pan drive unit 205a and a drive axis of the tilt drive unit 205b intersect is stored beforehand in a storage unit such as the ROM 208, as a reference position. The reference position is a position that does not change by the rotation drive of the pan drive unit 205a or the tilt drive unit 205b, and is determined based on the position of the rotation center of each of the pan drive unit 205a and the tilt drive unit 205b. In the present embodiment, the configuration in which the imaging apparatus 101 has the drive unit 205 is employed, but at least one of the pan drive unit 205a or the tilt drive unit 205b may be included as a unit separate from the imaging apparatus 101. A case where the drive axes of the respective drive units do not intersect will be described below in a second embodiment.

The CPU 206 comprehensively controls the imaging apparatus 101. The CPU 206 executes at least part of each function to be described below of the imaging apparatus 101, by reading out a program loaded into the RAM 207.

The RAM 207 provides a work area that the CPU 206 uses when executing the program, and also functions as a frame memory and as a buffer memory.

The ROM 208 stores image data, the program for the CPU 206 to control the imaging apparatus 101, and the like. The ROM 208 also serves as a storage unit that stores the reference position in the imaging apparatus 101, the initial position of the entrance pupil of the imaging optical system 201, and the like.

Figure 3:
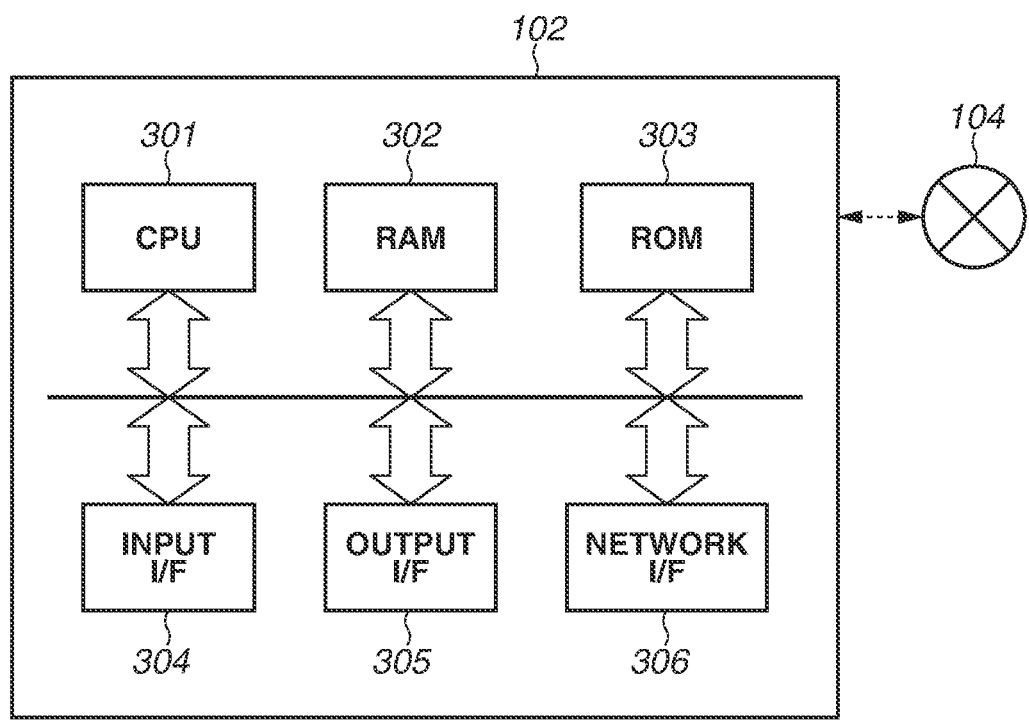
FIG. 3 is a diagram illustrating an example of an apparatus configuration of an information processing apparatus according to the first embodiment.

FIG. 3 is a diagram illustrating an example of an apparatus configuration of the information processing apparatus 102 according to the present embodiment. The information processing apparatus 102 has a CPU 301, a RAM 302, a ROM 303, an input interface (I/F) 304, an output I/F 305, and a network I/F 306.

The CPU 301 comprehensively controls the information processing apparatus 102. The CPU 301 executes at least part of each function to be described below of the information processing apparatus 102, by reading out a program loaded into the RAM 302.

The RAM 302 provides a work area that the CPU 301 uses when executing the program, and also functions as a frame memory and as a buffer memory.

The ROM 303 stores image data, the program for the CPU 301 to control the information processing apparatus 102, and the like.

The input I/F 304 is an interface for accepting an input from a user, such as a keyboard and a mouse. The coordinates of a viewpoint position in a virtual space, a viewing angle, a direction of a viewpoint, and the like are input to the input I/F 304.

The output I/F 305 is an interface for displaying an image, such as a display. The output I/F 305 displays an image captured by the imaging apparatus 101, displays an image (CG) of a virtual space, and a combined image in which an image captured by the imaging apparatus 101 and CG are combined.

The network I/F 306 is an interface connected to the imaging apparatus 101 via the network 104, and accepts an image output from the imaging apparatus 101 and information (e.g., the position of the entrance pupil) about the viewing angle of the imaging apparatus 101.

(About Misalignment between Entrance Pupil Position of Imaging Apparatus in Real Space and Viewpoint in Virtual Space)

Misalignment between an entrance pupil position of the imaging apparatus in a real space and a viewpoint in a virtual space will be described with reference to FIGS. 4A to 4D, and the influence of the misalignment on a combined image in which an image captured by the imaging apparatus in the real space and an image based on the viewpoint set in the virtual space are combined will also be described.

Figure 4A:
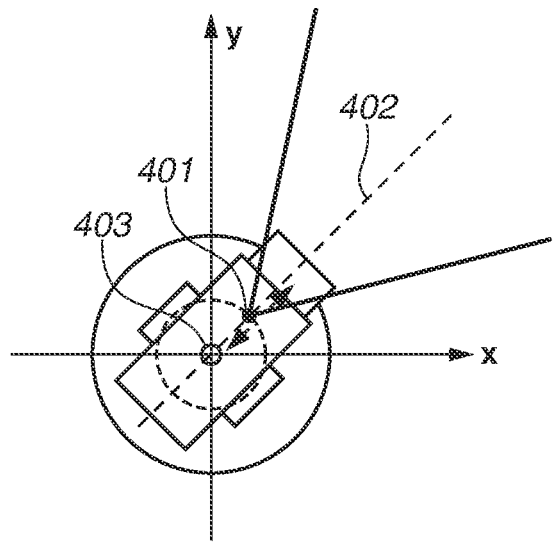
FIGS. 4A to 4D are diagrams each illustrating an example of either the position of an entrance pupil of the imaging apparatus according to the first embodiment or the position of a viewpoint in a virtual space.
Figure 4B:
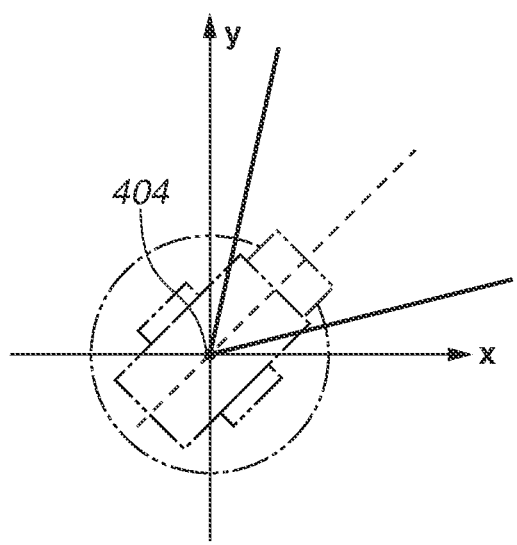
Figure 4C:
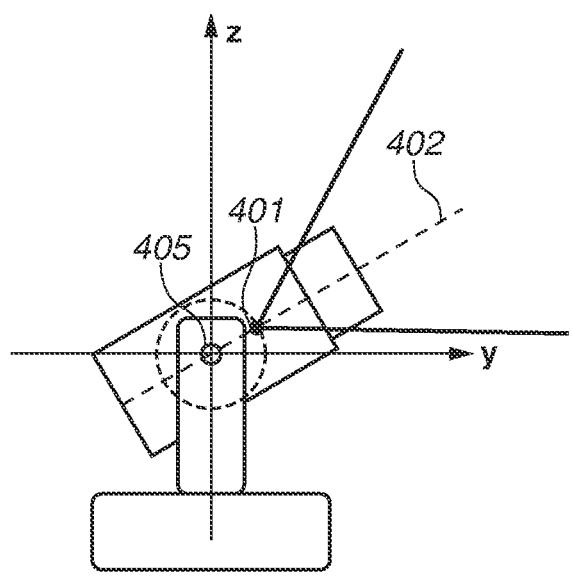
Figure 4D:
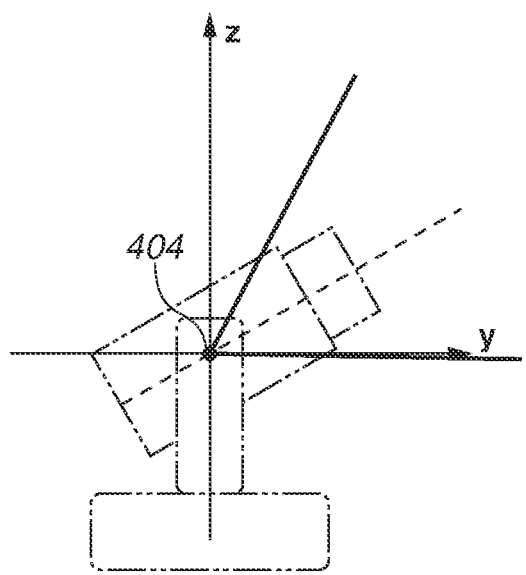

FIGS. 4A to 4D are diagrams illustrating the position of the entrance pupil of the imaging apparatus 101 according to the present embodiment and the viewpoint position set in the virtual space by the information processing apparatus 102. FIG. 4A is a diagram illustrating the position of the entrance pupil of the imaging optical system 201 as viewed from the pan axis side. FIG. 4B is a diagram illustrating the viewpoint position in the virtual space as viewed from the pan axis side. FIG. 4C is a diagram illustrating the position of the entrance pupil of the imaging optical system 201 as viewed from the tilt axis side. FIG. 4D is a diagram illustrating the viewpoint position in the virtual space as viewed from the tilt axis side.

A point 401 indicates the position of the entrance pupil in the imaging optical system 201 of the imaging apparatus 101. An optical axis 402 indicates an optical axis in the imaging optical system 201 of the imaging apparatus 101. A pan rotation axis 403 indicates the rotation axis of the pan drive unit 205a in the imaging apparatus 101. A point 404 indicates the viewpoint position in the virtual space. A tilt rotation axis 405 indicates the rotation axis of the tilt drive unit 205b in the imaging apparatus 101. Line segments from each of the point 401 and the point 404 indicate the viewing angle of the imaging apparatus 101.

The entrance pupil is a point that can be considered to be the starting point of a viewing angle in an imaging optical system. The entrance pupil is typically varied by a change in the zoom position or the focus position of a lens of a camera. In the case of a lens in which the zoom position and the focus position do not change, such as a single focus lens, the entrance pupil does not change. In the present embodiment, a case where the imaging optical system 201 is a lens capable of changing the zoom position and the focus position will be described. Accordingly, the point 401 (the position of the entrance pupil) moves on the optical axis 402.

In general, the entrance pupil of the imaging optical system and the rotation axis of each of pan and tilt are not at the same position. Therefore, as illustrated in FIGS. 4A and 4C, the position of the point 401 moves about the pan rotation axis 403 in a case where the pan drive unit 205a performs pan drive, and the position of the point 401 moves about the tilt rotation axis 405 in a case where the tilt drive unit 205b performs tilt drive. The viewing angle of the imaging apparatus 101 in the real space can be illustrated as in FIGS. 4A and 4C, starting from the point 401. The viewing angle varies depending on the zoom position and the focus position of the imaging optical system 201, and the maximum angle and the minimum angle thereof are determined by a factor such as the diameter of the imaging optical system 201, and depend on an optical design by a designer.

Meanwhile, the information processing apparatus 102 generates an image (CG) of the virtual space by referring to the set direction of the viewpoint and the set viewing angle, using the viewpoint position set in the virtual space as the starting point of the viewing angle. In general, in a case where the direction of the viewpoint is changed, the viewing angle is changed by being rotated starting from the set viewpoint position, and thus the position to be the starting point of the viewing angle (i.e., the viewpoint position) does not vary. Therefore, the point 404 is a point corresponding to the point 401, and is also a point corresponding to the position of each of the pan rotation axis 403 and the tilt rotation axis 405.

As described above, in general, the position (the point 401) of the entrance pupil in the real space and the position of the viewpoint position (the point 404) in the virtual space are different, and thus misalignment occurs even though both are positions to be the same starting point of the viewing angle. As a result, misalignment between the subject and an object in the virtual space occurs in the combined image in which the image captured by the imaging apparatus 101 and the image (CG) of the virtual space are combined, and thus the combined image gives a sense of discomfort. The imaging apparatus 101 according to the present embodiment has the following function to reduce this sense of discomfort in the combined image.

(Functional Configuration)

Figure 5:
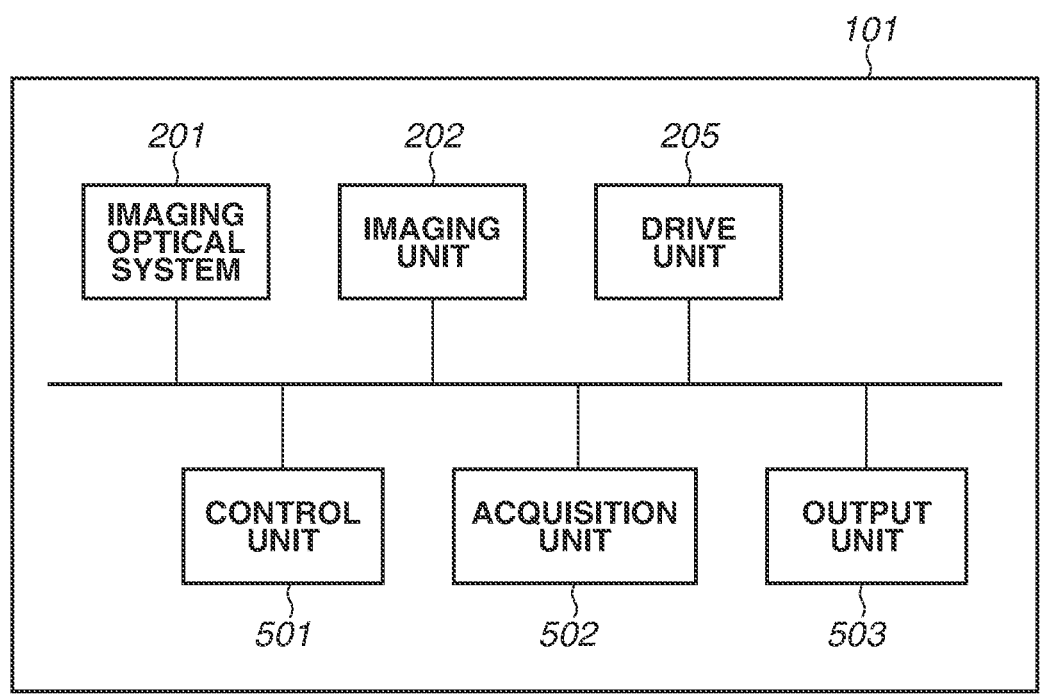
FIG. 5 is a diagram illustrating an example of a functional configuration of the imaging apparatus according to the first embodiment.

A functional configuration of the imaging apparatus 101 according to the present embodiment will be described with reference to FIG. 5. FIG. 5 is a block diagram illustrating an example of the functional configuration of the imaging apparatus 101 according to the present embodiment. The imaging apparatus 101 has the imaging optical system 201, the imaging unit 202, the drive unit 205, a control unit 501, an acquisition unit 502, and an output unit 503.

Functions performed by the imaging optical system 201, the imaging unit 202, and the drive unit 205 are similar to those of the apparatus configuration described above, and thus the description thereof will be omitted. In addition, for a function implemented by software among the functional blocks, a program for providing the function of each functional block is stored in a storage unit such as the ROM 208. This program is read out into the RAM 207, and the CPU 206 executes the program, so that the function is implemented. For a function implemented by hardware, for example, a dedicated circuit may be automatically generated on a field programmable gate array (FPGA) from the program for implementing the function of each functional block, using a predetermined compiler. A gate array circuit may be formed in a manner similar to the FPGA, and implemented as the hardware. The function may also be implemented by an application specific integrated circuit (ASIC). The configuration of the functional blocks illustrated in FIG. 5 is an example, and a plurality of functional blocks may form a single functional block, and any of the functional blocks may be divided into a plurality of functional blocks.

The control unit 501 controls the imaging optical system 201, the imaging unit 202, and the drive unit 205, based on the operation information received from the control apparatus 103. Specifically, the control unit 501 controls the zoom position and the focus position of the imaging optical system 201, and controls parameters (such as an exposure period and a gain) relating to imaging by the imaging unit 202. In the case of the drive unit 205, the control unit 501 controls the drive for the pan drive unit 205a or the tilt drive unit 205b to obtain the set pan angle or the set tilt angle.

The acquisition unit 502 acquires the position of the entrance pupil of the imaging optical system 201. In the present embodiment, the point (the position that does not change by the pan drive or the tilt drive) at which the rotation axis of the pan drive unit 205a and the rotation axis of the tilt drive unit 205b intersect is used as the reference position, and the position of the entrance pupil with respect to the reference position is acquired. The acquisition unit 502 acquires the position of the entrance pupil by calculating the position (three-dimensional coordinates) of the entrance pupil with respect to the reference position, based on the reference position stored in a storage unit such as the ROM 208, and the zoom position and the focus position of the imaging optical system 201. A table, a calculating formula, or the like, by which the position of the entrance pupil corresponding to the zoom position and the focus position can be acquired based on premade optical design data of the imaging optical system 201, may be stored in a storage unit such as the ROM 208. Further, the initial position of the entrance pupil with respect to the reference position is created beforehand using design dimensions data of the imaging apparatus 101, and the created initial position is stored in a storage unit such as the ROM 208. For example, the position of the entrance pupil in the initial state (e.g., a state where each of the pan angle and the tilt angle is 0 degrees) when the pan drive unit 205a and the tilt drive unit 205b of the drive unit 205 are powered on is stored as the initial position of the entrance pupil. The initial position of the entrance pupil is used in calculating the position of the entrance pupil at the time of the pan drive and the tilt drive by the drive unit 205. Specifically, the position of the entrance pupil after the pan drive and the tilt drive can be calculated by performing coordinate transformation based on the pan angle and the tilt angle with respect to the initial position of the entrance pupil.

A method of calculating the position of the entrance pupil after the pan drive or the tilt drive from the initial position of the entrance pupil will be described. First, assume that the three-dimensional coordinates of the initial position of the entrance pupil is p. Further, assume that the pan angle is ψ, and the tilt angle is θ. Furthermore, assume that a transformation matrix for rotating about an x-axis in FIG. 4A by θ is Rx(θ), and a transformation matrix for rotating about a z-axis by ψ is Rz(ψ). Assume that the position of the entrance pupil after the pan drive or the tilt drive with respect to the reference position is p', then a formula (1) holds.

$$p' = R_z(\psi) R_x(\theta) p \quad (1)$$

This formula is an example, and other formula may be used if the three-dimensional position of the entrance pupil with respect to the reference position can be calculated.

The output unit 503 outputs the position of the entrance pupil with respect to the reference position acquired by the acquisition unit 502, as a viewpoint position to be set in the virtual space. The output unit 503 may output information about the viewing angle including the position of the entrance pupil with respect to the reference position. The information about the viewing angle may include at least one of the pan angle, the tilt angle, and the zoom position and the focus position of the imaging optical system 201, in addition to the position of the entrance pupil with respect to the reference position.

An example of the information about the viewing angle will be described with reference to FIG. 6. FIG. 6 is a diagram illustrating an example of the information about the viewing angle. The information about the viewing angle will be referred to below as camera data. The camera data includes setting information for controlling the viewpoint in the virtual space. Specifically, the camera data includes information of pan angle, tilt angle, roll angle, X position, Y position, Z position, zoom, and focus. For each of the pan angle and the tilt angle, information indicating the angle of the corresponding one of the drive units in the drive unit 205 is stored. For the roll angle, a roll angle representing the inclination of the imaging apparatus 101 itself acquired by a sensor or the like attached to the imaging apparatus 101 is originally stored, but in the present embodiment, a roll angle stored beforehand in a storage unit such as the ROM 208 is stored. For each of the X position, the Y position, and the Z position, the position of the entrance pupil with respect to the reference position acquired by the acquisition unit 502 is stored. For example, if the pan angle and the tilt angle are 0 degrees, information indicating the initial position of the entrance pupil stored beforehand is directly stored. For each of the X position, the Y position, and the Z position, a coordinate value indicating the position of the imaging apparatus 101 acquired by the sensor or the like attached to the imaging apparatus 101 is originally stored. In the present embodiment, a value overwritten by the position of the entrance pupil with respect to the reference position may be stored. Alternatively, a value determined by adding the position of the entrance pupil with respect to the reference position to the coordinate value indicating the position of the imaging apparatus 101 may be output as information including the position of the entrance pupil, and the output value may be stored. In other words, information indicating the position of the imaging apparatus 101 may be corrected based on the information indicating the position of the entrance pupil with respect to the reference position. For the zoom and the focus, information indicating the zoom position and information indicating the focus position, respectively, of the imaging optical system 201 are stored. As described above, the output unit 503 outputs the camera data which is the information including the position of the entrance pupil with respect to the reference position, as information about the viewpoint in the virtual space.

Figure 7:
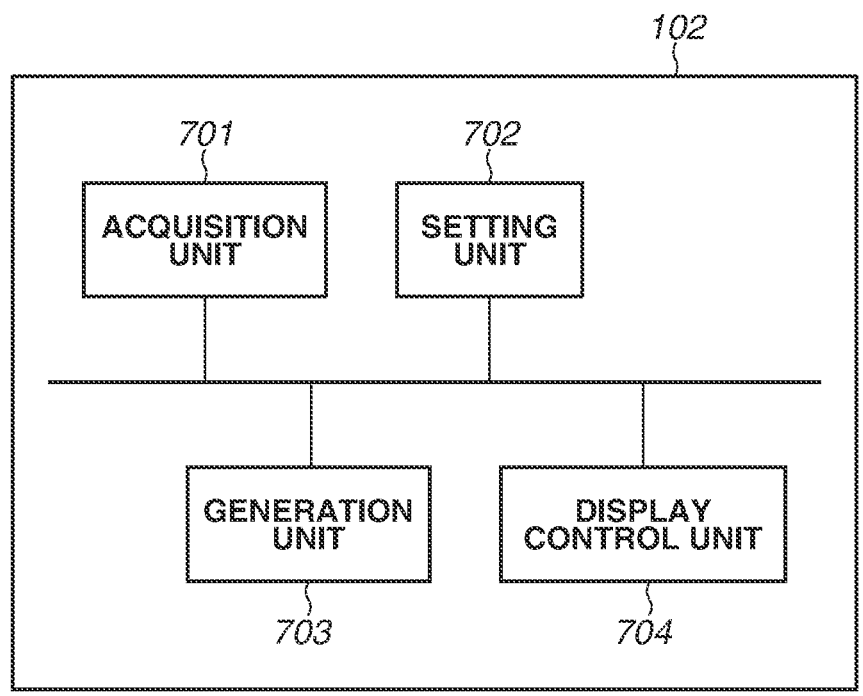
FIG. 7 is a diagram illustrating an example of a functional configuration of the information processing apparatus according to the first embodiment.

A functional configuration of the information processing apparatus 102 according to the present embodiment will be described with reference to FIG. 7. FIG. 7 is a diagram illustrating an example of the functional configuration of the information processing apparatus 102 according to the present embodiment. The information processing apparatus 102 has an acquisition unit 701, a setting unit 702, a generation unit 703, and a display control unit 704. A program for providing the function of each functional block illustrated in FIG. 7 is stored in a storage unit such as the ROM 303. This program is read out into the RAM 302, and the CPU 301 executes the program, so that the function is implemented. For a function implemented by hardware, for example, a dedicated circuit may be automatically generated on an FPGA from the program for implementing the function of each functional block, using a predetermined compiler. A gate array circuit may be formed in a manner similar to the FPGA, and implemented as the hardware. The function may also be implemented by an ASIC. A plurality of functional blocks may form a single functional block, and any of the functional blocks may be divided into a plurality of functional blocks.

The acquisition unit 701 acquires the image captured by the imaging apparatus 101 and the camera data (the information about the viewpoint in the virtual space) output from the output unit 503.

The setting unit 702 sets/updates the information about the viewpoint in the virtual space, based on the camera data acquired by the acquisition unit 701.

The generation unit 703 generates an image (CG) of the virtual space, based on the information about the viewpoint set in the virtual space by the setting unit 702. In addition, the generation unit 703 generates an image in which a subject in the real space appears as if it exists in the virtual space, by combining the image acquired by the acquisition unit 701 and the generated image.

The display control unit 704 controls the output I/F 305 to display at least one of the image generated by the generation unit 703 or the image acquired by the acquisition unit 701.

(Description of Operation)

Figure 8:
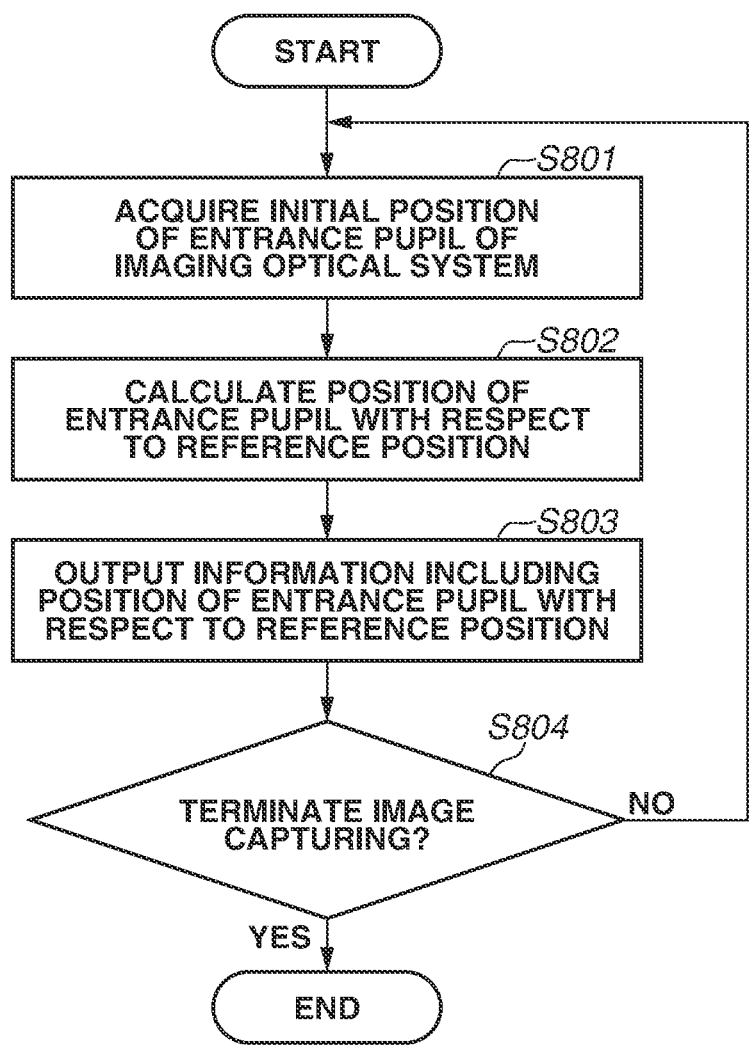
FIG. 8 is a flowchart illustrating an example of operation of the imaging apparatus according to the first embodiment.

The operation of the imaging apparatus 101 according to the present embodiment will be described with reference to FIG. 8. FIG. 8 is a flowchart illustrating the operation of the imaging apparatus 101 according to the present embodiment. The CPU 206 of the imaging apparatus 101 loads the program stored in the ROM 208 into the RAM 207, and executes the program loaded into the RAM 207, so that the operation of the flowchart illustrated in FIG. 8 starts.

In step S801, the acquisition unit 502 acquires the initial position of the entrance pupil of the imaging optical system 201. The initial position of the entrance pupil is calculated beforehand based on the optical design data of the imaging optical system 201, and the calculated initial position of the entrance pupil is stored in a storage unit such as the ROM 208. The acquisition unit 502 acquires the initial position of the entrance pupil by reading out the initial position of the entrance pupil from the storage unit. In a case where the imaging optical system 201 is a lens capable of adjusting optical zoom or focus as with a zoom lens or a focus lens, the acquisition unit 502 further acquires the zoom position or the focus position of the imaging optical system 201. Furthermore, the acquisition unit 502 acquires the initial value of the entrance pupil corresponding to the acquired zoom position or focus position. In a case where the imaging optical system 201 is a lens in which a zoom position and a focus position do not change, such as a single focus lens, this process is not necessary. In a case where the imaging optical system 201 is attachable to and detachable from the imaging apparatus, the operation in step S801 may be changed based on determination by a determination unit (not illustrated) as to whether the imaging optical system 201 is a single focus lens.

In step S802, the acquisition unit 502 calculates the position of the entrance pupil with respect to the reference position. The acquisition unit 502 calculates the position of the entrance pupil with respect to the reference position, by performing coordinate transformation of the initial position of the entrance pupil based on the pan angle or the tilt angle of the drive unit 205. In a case where the pan angle and the tilt angle of the drive unit 205 do not change from the initial state, this operation is not necessary. This is because the initial position of the entrance pupil is the position of the entrance pupil at the pan angle and the tilt angle of the drive unit 205 in a state where the imaging apparatus 101 is activated. Accordingly, the operation in step S802 can be omitted in a case where the pan angle or the tilt angle is not changed from the initial state.

In step S803, the output unit 503 outputs information including the position of the entrance pupil with respect to the reference position. The information may be output in any format, if the position of the entrance pupil with respect to the reference position is included. For example, the information may be the above-described camera data.

In step S804, the CPU 206 determines whether to terminate image capturing. The operation of this flowchart ends in a case where the image capturing is terminated (YES in step S804), and the operation of this flowchart returns to step S801 in a case where the image capturing is not terminated (NO in step S804). In a case where the zoom magnification and the focus position have not changed, the operation may return to step S802.

Figure 9:
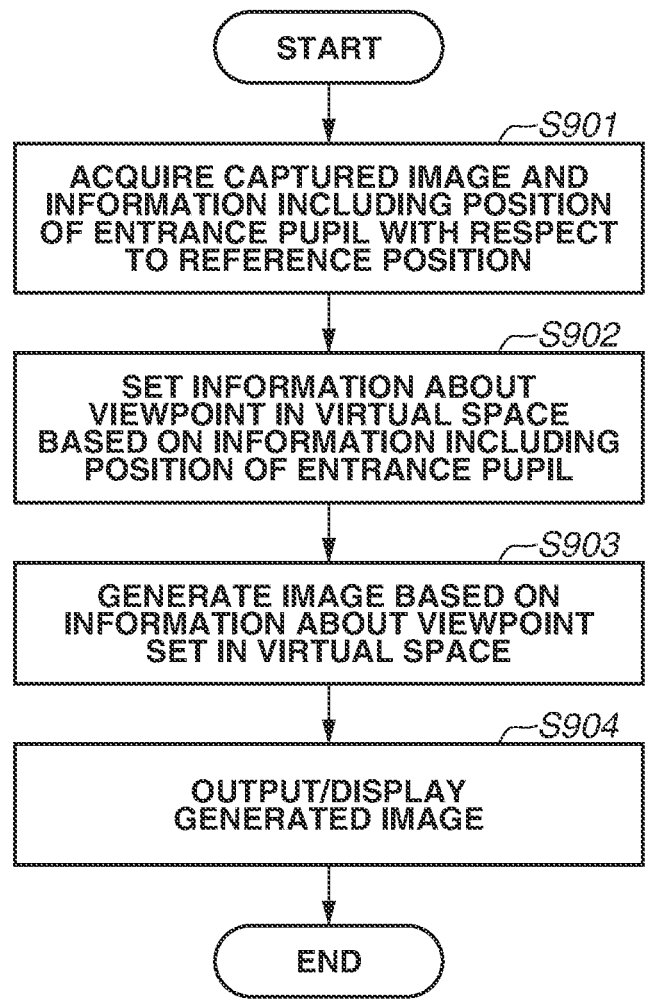
FIG. 9 is a flowchart illustrating an example of operation of the information processing apparatus according to the first embodiment.

The operation of the information processing apparatus 102 according to the present embodiment will be described with reference to FIG. 9. FIG. 9 is a flowchart illustrating the operation of the information processing apparatus 102 according to the present embodiment. The CPU 301 of the information processing apparatus 102 loads the program stored in the ROM 303 into the RAM 302, and executes the program loaded into the RAM 302, so that the operation of the flowchart illustrated in FIG. 9 starts.

In step S901, the acquisition unit 701 acquires the information including the position of the entrance pupil with respect to the reference position from the imaging apparatus 101. In the present embodiment, the acquisition unit 701 acquires the camera data. In addition, the acquisition unit 701 acquires the image captured by the imaging apparatus 101.

In step S902, the setting unit 702 sets the information about the viewpoint in the virtual space, based on the camera data.

In step S903, the generation unit 703 generates an image (CG) of the virtual space, based on the information about the viewpoint set in the virtual space. The generation unit 703 generates a combined image in which the generated image and the image captured by the imaging apparatus 101 are combined.

In step S904, the display control unit 704 causes the output I/F 305 to output/display the image generated in step S903.

According to the imaging apparatus 101 in the present embodiment, the information including the position of the entrance pupil is output as the viewpoint position in the virtual space. This makes it possible to reduce the misalignment between the position of the viewpoint in the virtual space and the position of the entrance pupil, and to reduce a sense of discomfort in the combined image in which the image captured by the imaging apparatus 101 and the image in the virtual space are combined.

In the first embodiment, the case where the optical axis of the imaging optical system 201 intersects the rotation axis of each of the pan drive unit 205a and the tilt drive unit 205b at the reference position is described. The second embodiment is aimed at reducing a sense of discomfort in a combined image, even in a case where an optical axis and a rotation axis do not intersect. An apparatus configuration and a functional configuration of an imaging apparatus 101 according to the present embodiment are similar to those in the first embodiment, and thus the description thereof will be omitted.

Figure 10:
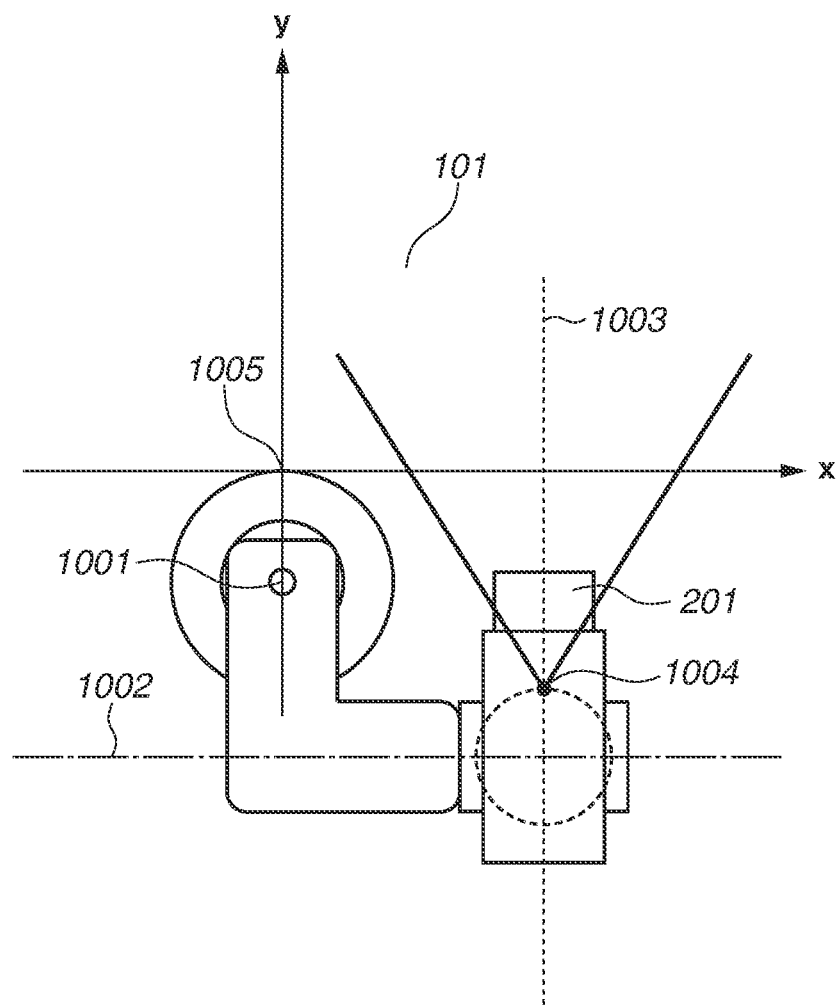
FIG. 10 is a diagram illustrating an example of a position of an entrance pupil, and an example of a position of a rotation axis of each of a pan drive unit and a tilt drive unit, in an imaging apparatus according to a second embodiment.

FIG. 10 illustrates an example of an appearance of the imaging apparatus 101 in the present embodiment. FIG. 10 illustrates a pan rotation axis 1001, a tilt rotation axis 1002, and an optical axis 1003 and a position 1004 of an entrance pupil of an imaging optical system 201 of the imaging apparatus 101. In the present embodiment, a reference position (a position that does not change by drive) in pan drive is different from that in tilt drive.

(Description of Operation)

Operation in the present embodiment is different from that in the first embodiment only in step S802, and thus the description of other steps will be omitted.

In step S802, a method of calculating the position of the entrance pupil with respect to the reference position (an origin 1005) based on a pan angle and a tilt angle is different. In a case where the reference position in the pan drive and the reference position in the tilt drive are different, the acquisition unit 502 acquires the rotation axis of each of the pan drive and the tilt drive. Subsequently, the rotation axis of the pan drive and the rotation axis of the tilt drive are transformed to intersect at a predetermined position, and a position of the entrance pupil from the reference position is calculated using the predetermined position as the reference position, so that the position of the entrance pupil is acquired.

Assume that a transformation matrix for rotating about an x-axis in FIG. 10 by θ is R_x(θ), and a transformation matrix for rotating about a z-axis by ψ is R_z(ψ). Next, assume that a transformation matrix for translating the tilt rotation axis 1002 to intersect the origin 1005 is T_tilt. Further, assume that a transformation matrix obtained by multiplying the translation component of T_tilt by −1 is T_tilt^−1. Then, assume that a transformation matrix for translating the pan rotation axis 1001 to intersect the origin 1005 is T_pan. Similarly, assume that a transformation matrix obtained by multiplying the translation component of T_pan by −1 is T_pan^−1, then a position p' of the entrance pupil can be calculated by a formula (2). Note that p, ψ, θ, and p' are similar to those in the first embodiment.

$$p' = T'_{pan} Rz(\psi) T_{pan} T'_{tilt} Rz(\theta) T_{tilt} p \quad (2)$$

The formula is an example, and other formula may be used if the three-dimensional position of the entrance pupil with respect to the reference position can be calculated.

According to the present embodiment, a sense of discomfort in the combined image in which the image captured by the imaging apparatus 101 and the image of the virtual space are combined can be reduced even in a case where the optical axis and the rotation axis do not intersect.

A third embodiment of the present invention will be described. The present embodiment is different from the first embodiment in that a device that can acquire a position and an orientation is added to an imaging apparatus 101, but otherwise similar to the first embodiment in terms of an apparatus configuration and a functional configuration. In the present embodiment, the device that can acquire the position and the orientation is a device that can acquire positional information and orientation information of the imaging apparatus 101 with respect to coordinates set in a real space. The positional information is three-dimensional position coordinates in a coordinate system set in the real space. The orientation information is information indicating a rotation angle of yaw, roll, and pitch of the imaging apparatus 101, in the coordinate system set in the real space. A support like a dolly that can measure a movement amount and a rotation amount by having a rotary encoder is an example of the device that can acquire the position and the orientation. Another example is a device that can estimate a self-position from an image, sensor information, or the like. The device that can acquire the position and the orientation is not limited to the above-described examples. The acquisition unit 502 acquires the information from the device that can acquire the position and the orientation of the imaging apparatus 101.

Operation of the imaging apparatus 101 according to the present embodiment is different from that in the first embodiment only in step S801 and step 803, and thus the description of other steps will be omitted.

In step S801, the acquisition unit 502 further acquires information about the position and the orientation of the imaging apparatus 101.

Camera data output by an output unit 503 in step S803 will be described. The format of the camera data is similar to that in the first embodiment. For each of an X position, a Y position, and a Z position, the position of an entrance pupil with respect to a reference position acquired in step S801 and the information about the position and the orientation of the imaging apparatus 101 are combined in response to a request from an information processing apparatus 102, and the result is stored. Subsequently, for each of a pan angle, a tilt angle, and a roll angle, the orientation information acquired in step S801, a pan angle acquired from a pan drive unit 205*a*, and a tilt angle acquired from a tilt drive unit 205*b* are combined in response to a request from the information processing apparatus 102, and the result is stored.

As described above, according to the present embodiment, a sense of discomfort in a combined image can be reduced even in a case where the imaging apparatus 101 moves.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is defined by the scope of the following claims.

This application claims the benefit of Japanese Patent Application No. 2022-028247, filed Feb. 25, 2022, which is hereby incorporated by reference herein in its entirety.

What is claimed is:

1. An imaging apparatus configured to communicate with an information processing apparatus that generates an image, based on information about a viewpoint position set in a virtual space, the imaging apparatus comprising:
   an image sensor configured to capture an image of a subject formed by an imaging optical system;
   a pan and tilt drive configured to rotate an imaging direction of the image sensor in a pan direction or a tilt direction;
   at least one processor; and
   a memory coupled to the at least one processor, the memory having instructions that, when executed by the processor, performs operations as:
   acquiring a position that does not change by rotation of the pan and tilt drive as a reference position, and acquire a position of an entrance pupil of the imaging optical system with respect to the reference position; and
   outputting information including the position of the entrance pupil to the information processing apparatus,
   wherein the viewpoint position is set based on the position of the entrance pupil,
   wherein the position of the entrance pupil with respect to the reference position is recalculated according to change of one of a focus position and a zoom position.

2. The imaging apparatus according to claim 1, further configured to output the information which includes at least one of an angle of the pan direction of the pan and tilt drive, an angle of the tilt direction of the pan and tilt drive, and the zoom position and the focus position of the imaging optical system.

3. The imaging apparatus according to claim 1, further configured to output the information which includes a position of the imaging apparatus, the position being corrected based on the position of the entrance pupil acquired.

4. The imaging apparatus according to claim 1, further configured to acquire the position of the entrance pupil, the position being transformed based on an angle of the tilt direction and an angle of the pan direction of the pan and tilt drive.

5. The imaging apparatus according to claim 1, further configured to acquire the position of the entrance pupil, the position corresponding to the zoom position and the focus position of the imaging optical system.

6. The imaging apparatus according to claim 1,
   further configured to acquire a position of a rotation axis of the pan and tilt drive in the pan direction and a position of a rotation axis of the pan and tilt drive in the tilt direction and wherein, in a case where the rotation axis of the pan direction and the rotation axis of the tilt direction do not intersect, the position of the rotation axis of the pan direction and the position of the rotation axis of the tilt direction are transformed to intersect at a predetermined position, and
   further configured to output information including a position of the entrance pupil with respect to the predetermined position, as the information about the viewpoint position.

7. An information processing apparatus that communicate with the imaging apparatus according to claim 1, the information processing apparatus comprising:
   at least one processor; and
   a memory coupled to the at least one processor, the memory having instructions that, when executed by the processor, performs operations as:
   acquiring information about a viewpoint position in a virtual space output from the imaging apparatus and an image captured by the imaging apparatus;
   setting the information about the viewpoint position acquired by the acquisition unit; and
   generating an image of the virtual space, based on the information about the viewpoint position set, and generate a combined image in which the image of the virtual space and the image captured by the imaging apparatus are combined.

8. A control method for an imaging apparatus that communicates with an information processing apparatus that generates an image, based on information about a viewpoint position set in a virtual space, the control method comprising:
   acquiring a position of an entrance pupil of an imaging optical system with respect to a reference position, using a position that does not change by rotation in a pan direction or a tilt direction in the imaging apparatus, as the reference position; and
   outputting information including the position of the entrance pupil with respect to the reference position to the information processing apparatus,
   wherein the viewpoint position is set based on the position of the entrance pupil,
   wherein the position of the entrance pupil with respect to the reference position is recalculated according to change of one of a focus position and a zoom position.

9. The control method according to claim 8, wherein the output information includes at least one of an angle of the pan direction, an angle of the tilt direction, and the zoom position and the focus position of the imaging optical system.

10. The control method according to claim 8, wherein the output information includes a position of the imaging apparatus, the position being corrected based on the acquired position of the entrance pupil.

11. The control method according to claim 8, wherein the acquired position of the entrance pupil is a position transformed based on an angle of the pan direction and an angle of the tilt direction.

12. The control method according to claim 8, wherein the acquired position of the entrance pupil corresponds to the zoom position and the focus position of the imaging optical system.

13. The control method according to claim 8,
   wherein a position of a rotation axis of the pan direction and a position of a rotation axis of the tilt direction are acquired and wherein, in a case where the rotation axis of the pan direction and the rotation axis of the tilt direction do not intersect, the position of the rotation axis of the pan direction and the position of the rotation axis of the tilt direction are transformed to intersect at a predetermined position, and wherein information including a position of the entrance pupil with respect to the predetermined position is output as the information about the viewpoint position.

14. A non-transitory computer-readable storage medium storing a program for causing a computer to execute a method comprising:
acquiring a position of an entrance pupil of an imaging optical system with respect to a reference position, using a position that does not change by rotation in a pan direction or a tilt direction, as the reference position, in an imaging apparatus; and
outputting information including the position of the entrance pupil to an information processing apparatus,
wherein the viewpoint position is set based on the position of the entrance pupil,
wherein the position of the entrance pupil with respect to the reference position is recalculated according to change of one of a focus position and a zoom position.

\* \* \* \* \*